(12) United States Patent
Vlot et al.

(10) Patent No.: US 6,502,183 B2
(45) Date of Patent: *Dec. 31, 2002

(54) STACK ORIENTED DATA PROCESSING DEVICE

(75) Inventors: Marnix C. Vlot, Eindhoven (NL); Paul E. R. Lippens, Eindhoven (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/128,150

(22) Filed: Aug. 3, 1998

(65) Prior Publication Data

US 2002/0002665 A1 Jan. 3, 2002

(30) Foreign Application Priority Data

Aug. 18, 1997 (EP) .............................................. 97202530
Aug. 28, 1997 (EP) .............................................. 97202638

(51) Int. Cl.[7] ............................................... G06F 11/00
(52) U.S. Cl ........................ 712/202; 711/132; 712/210; 712/32
(58) Field of Search ........................... 711/132; 712/32, 712/202, 210, 260

(56) References Cited

U.S. PATENT DOCUMENTS

| 3,786,432 | A | * | 1/1974 | Woods ..................... 365/230.9 |
| 4,325,120 | A | * | 4/1982 | Colley et al. ............... 711/202 |
| 4,974,157 | A | * | 11/1990 | Winfield et al. ............. 712/202 |
| 5,070,451 | A | * | 12/1991 | Moore et al. ................... 712/32 |
| 5,241,679 | A | * | 8/1993 | Nakagawa et al. .......... 710/260 |
| 5,319,757 | A | * | 6/1994 | Moore et al. .................. 712/32 |
| 5,335,332 | A | * | 8/1994 | Christopher, Jr. et al. .... 700/90 |
| 5,530,890 | A | * | 6/1996 | Moore et al. .................. 712/32 |
| 5,634,046 | A | * | 5/1997 | Chatterjee et al. ........... 712/227 |
| 5,903,899 | A | * | 5/1999 | Steele, Jr. .................... 707/206 |

FOREIGN PATENT DOCUMENTS

EP 0437235 A2 * 7/1971

OTHER PUBLICATIONS

IBM Technical Disclosure Bulletin, G.A. Gates et al., "Multiword Size Storage", vol. 11, No. 8, Jan. 1969, pp. 1019–1020.*
"XA User Guide", pp. 33–57, Jul. 21, 1995. (supplied by applicant with the application filed on Aug. 3, 1998).*
* Copy of the reference is not being furnished because it was an Applicant supplied document.*
Philips Semiconductor Data Book, IC25, 1996; pp. 33–56.

* cited by examiner

Primary Examiner—Zarni Maung
Assistant Examiner—Wen-Tai Lin

(57) ABSTRACT

The data processing device maintains two stacks. The length of the basic unit of information is different for each stack. Pops and pushes cause a change in the stack pointer which differs dependent on which stack is used. Instructions refer to different locations on the stack as registers defined by an offset of a number of basic units relative to the top of stack. In an embodiment a reference to registers is normally interpreted as a reference to one of a set of registers (including the top of stack register) without push or pop, but a reference to one register is interpreted as a reference to, top of stack including a push or pop.

16 Claims, 4 Drawing Sheets

| Instruction | | Data Format | opc | op1 | op2 | op3 | op4 | nibbles |
|---|---|---|---|---|---|---|---|---|
| LdA | 1 | An,(Am+offset5) | 5 | 3 | 3 | 5 | | 4 |
| | 2 | An,(Am+offset13) | 9 | 3 | 3 | 13 | | 7 |
| | 3 | An,#immediate8 | 9 | 3 | 8 | | | 5 |
| | 4 | An,#immediate24 | 9 | 3 | 24 | | | 9 |
| | 5 | +A0,#immediate24 | 4 | 24 | | | | 7 |
| StA | 1 | An,(Am+offset5) | 5 | 3 | 3 | 5 | | 4 |
| | 2 | An,(Am+offset13) | 9 | 3 | 3 | 5 | | 5 |
| AddA | 1 | An,offset5 | 8 | 3 | 5 | | | 4 |
| | 2 | An,Dn | 11 | 3 | 2 | | | 4 |
| | 3 | An,offset13 | 8 | 3 | 13 | | | 6 |
| | 4 | +A0,An,offset5 | 8 | 3 | 5 | | | 4 |
| | 5 | +A0,An,Dn | 11 | 3 | 2 | | | 4 |
| | 6 | +A0,An,offset13 | 8 | 3 | 13 | | | 6 |
| CA | 1 | <cc1>,#n | 9 | 1 | 2 | | | 3 |
| | 2 | <cc1>,An,#n | 10 | 1 | 3 | 2 | | 4 |
| LdB | 1 | s,Dn,(An+offset5) | 5 | 1 | 2 | 3 | 5 | 4 |
| | 2 | s,Dn,(An+offset13) | 9 | 1 | 2 | 3 | 13 | 7 |
| | 3 | s,Dn,(An+Dm) | 8 | 1 | 2 | 3 | 2 | 4 |
| | 4 | s,Dn,(An+=offset5) | 9 | 1 | 2 | 3 | 5 | 5 |
| | 5 | s,[+]D0,(An) | 7 | 1 | 1 | 3 | | 3 |
| LdD | 1 | Dn,(An+offset5) | 6 | 2 | 3 | 5 | | 4 |
| | 2 | Dn,(An+offset13) | 8 | 2 | 2 | 3 | 13 | 7 |
| | 3 | Dn,(An+Dm) | 5 | 2 | 3 | 2 | | 3 |
| | 4 | Dn,(An+=offset5) | 6 | 2 | 3 | 5 | | 4 |
| | 5 | Dn,#imm5 | 5 | 2 | 5 | | | 3 |
| | 6 | Dn,#imm13 | 9 | 2 | 13 | | | 6 |
| | 7 | +D0,Dn_ext | 5 | 3 | | | | 2 |
| | 8 | [+]D0,(An*) | 5 | 1 | 2 | | | 2 |
| | 9 | [+]D0,#imm2 | 5 | 1 | 2 | | | 2 |
| StB | 1 | Dn,(An+offset5) | 6 | 2 | 3 | 5 | | 4 |
| | 2 | Dn,(An+offset13) | 10 | 2 | 3 | 13 | | 7 |
| | 3 | Dn,(An+Dm) | 9 | 2 | 3 | 2 | | 4 |
| | 4 | Dn,(An+=offset5) | 10 | 2 | 3 | 5 | | 5 |
| | 5 | D0[-],(An*) | 5 | 1 | 2 | | | 2 |
| StD | 1 | Dn,(An+offset5) | 6 | 2 | 3 | 5 | | 4 |
| | 2 | Dn,(An+offset13) | 6 | 2 | 3 | 13 | | 6 |
| | 3 | Dn,(An+Dm) | 9 | 2 | 3 | 2 | | 4 |
| | 4 | Dn,(An+=offset5) | 6 | 2 | 3 | 5 | | 4 |
| | 5 | D0[-],(An*) | 5 | 1 | 2 | | | 2 |

FIG. 2a

| Instruction | | Data Format | opc | op1 | op2 | op3 | op4 | nibbles |
|---|---|---|---|---|---|---|---|---|
| Add | 1 | [+]D0,Dn,Dm | 7 | 1 | 2 | 2 | | 3 |
| | 2 | [+]D0,Dn,imm2 | 7 | 1 | 2 | 2 | | 3 |
| | 3 | Dn,imm5 | 9 | 2 | 5 | | | 4 |
| | 4 | Dn,D0- | 6 | 2 | | | | 2 |
| Sub | 1 | [+]D0,Dn,Dm | 7 | 1 | 2 | 2 | | 3 |
| | 2 | [+]D0,Dn,imm2 | 7 | 1 | 2 | 2 | | 3 |
| | 3 | Dn,imm5 | 9 | 2 | 5 | | | 4 |
| | 4 | Dn,D0- | 6 | 2 | | | | 2 |
| Addc | 1 | Dn,Dm | 12 | 2 | 2 | | | 4 |
| Subc | 1 | Dn,Dm | 12 | 2 | 2 | | | 4 |
| Shl | 1 | Dn,im2 | 8 | 2 | 2 | | | 3 |
| Shr | 1 | s,Dn,im2 | 7 | 1 | 2 | 2 | | 3 |
| And | 1 | Dn,Dm | 8 | 2 | 2 | | | 3 |
| | 1 | Dn,imm5 | 9 | 2 | 5 | | | 4 |
| Or | 1 | Dn,Dm | 8 | 2 | 2 | | | 3 |
| | 2 | Dn,imm5 | 9 | 2 | 5 | | | 4 |
| Xor | 1 | Dn,Dm | 8 | 2 | 2 | | | 3 |
| | 2 | Dn,imm5 | 9 | 2 | 5 | | | 4 |
| Not | 1 | Dn | 10 | 2 | | | | 3 |
| CGT[E][U] | 1 | Dn,Dm,cc,#n | 8 | 2 | 2 | 2 | 2 | 4 |
| CE | 1 | <e,ne>,Dn,Dm,#n | 9 | 1 | 2 | 2 | 2 | 4 |
| Ccc | 2 | cc,Dn,imm4,#n | 4 | 4 | 2 | 4 | 2 | 4 |
| Ccc | 2 | cc,Dn,imm8,#n | 8 | 4 | 2 | 8 | 2 | 6 |
| Br | 1 | offset7 | 5 | 7 | | | | 3 |
| Br | 1 | offset13 | 11 | 13 | | | | 6 |
| J | 1 | address24 | 8 | 24 | | | | 8 |
| JL | 1 | address24 | 8 | 24 | | | | 8 |
| SAV | 1 | | 8 | | | | | 2 |
| RES | 1 | | 8 | | | | | 2 |
| PopA | 1 | #imm2 | 6 | 2 | | | | 2 |
| PopD | 1 | #imm2 | 6 | 2 | | | | 2 |
| RET[,popA][,popD] | 1 | #1,#1 | 6 | 1 | 1 | | | 2 |
| Si | 1 | #5 | 11 | 5 | | | | 4 |
| Tr | 1 | #5 | 11 | 5 | | | | 4 |

FIG. 2b

STACK ORIENTED DATA PROCESSING DEVICE

FIELD OF THE INVENTION

The invention relates to a data processing device for storing data and executing instructions. Such a data processing device is described in the architectural overview of the Philips 80C51XA processor, published in the 1996 data handbook IC25 published by Philips Semiconductors, pages 33 to 56.

BACKGROUND OF THE INVENTION

A stack can be maintained for example by means of a stack pointer register which stores a memory address pointer. During a push operation the memory address pointer is incremented and information is stored at the memory location to which it points. By means of successive pushes information is thus written into a series of consecutive memory locations. This information can be read by addressing memory locations relative to the top of stack.

The pop operation is the reverse of the push operation. During a pop operation information is read from the memory location to which the address pointer points and the memory address pointer is decremented.

The 80C51XA processor supports such a stack mechanism because it has instructions with an addressing mode in which addresses are expressed by reference to a register which contains a memory address pointer. By referring to a register the instruction identifies memory address pointer in that address as the pointer to the memory location that is to be used as the source of an operand or the destination of a result. Several registers can be used in this way, and therefore each can be used as a stack pointer. The 80C51XA processor also specifically defines a user stack and a system stack for return from procedure calls and interrupts. The stack pointer to these stacks map to one of the normal registers.

There is an addressing mode in which execution an instruction will implicitly cause the register to which it refers to be incremented or decremented together with its functional operation of the instruction. Increments or decrements are in units of 16 bit words addresses, that is, the content of the register is incremented or decremented by 2 byte addresses at a time.

Stacks provide a powerful mechanism for managing information, especially when used to execute programs defined by higher level languages. This means that large numbers of items will be stored on a stack and that a stack will use a considerable amount of randomly accessible memory space.

SUMMARY OF THE INVENTION

Amongst others, it is an object of the invention to provide for a processing device in which less memory space is needed for stacked information.

It is another object of the invention to reduce the amount of memory space needed for storing programs that make use of stacks.

It is another object of the invention to provide a powerful set of stack handling instructions without making instructions unduly large.

The processing device according to the invention is characterized by a means for maintaining push and/or pop information in basic units of a first and second length on a first and second stack respectively, the first and second length being unequal, and not an integer multiple of one another, and where the first stack is used for addressing and the second stack is used for data. The first stack may be used for example for numerical data values, to be used as operands in various arithmetic and/or logic instructions, in which case that basic unit if for example a 16 bit word and the second stack may be used for addresses to be used as addresses for operands in such arithmetic and/or logic instructions, in which case the basic unit is for example a 24 bit word.

Thus, the lengths of basic units are for example 16 bit and 24 bit for the first and second stack respectively. As a result, when a first and second stack pointer are used which point to a memory addressed in terms of bytes, the first stack pointer will be changed by two byte addresses as a result of a push and/or pop and the second stack pointer will be changed by three byte addresses as a result of a push or a pop. The first stack may be used for example for numerical data values, to be used as operands in various arithmetic and/or logic instructions and the second stack may be used for addresses to be used as addresses for operands in such arithmetic and/or logic instructions.

The basic length of data values and addresses will generally differ due to the different use that is made of these two types of information. When, contrary to the invention, only one basic unit length is available for stacking both type s of information this means that storage space on the stack will be wasted on useless information. This is avoided by the invention due to the use of stacks with different lengths for basics tacking units. The invention is not limited to addresses and data: the invention may be used under any circumstances where two types of information with different meaningful lengths are used.

An embodiment of the processing device according to the invention is that the instruction set uses a first and second addressing mode for designating storage locations in terms of an offset relative to a top of the first and second stack respectively, expressability of the offset being restricted to numbers of basic units for one of the first or second stacks. In this embodiment the instructions can be kept short, because they address offsets in units adapted to the relevant stack and no instruction space is wasted by expressing offset which would express finer differences in that stack.

Further embodiments of the processing device according to the invention are that push and pop are coded by sacrificing a small amount of the offsets that can be specified relative to the top of stack, preferably the largest offset.

BRIEF DESCRIPTION OF THE DRAWINGS

These and other advantageous aspects of the processing device according to the invention will be described in a non-limitative way using the following figures, of which

DETAILED DESCRIPTION OF THE PREFERRED EMBODIMENT

Figure 1:
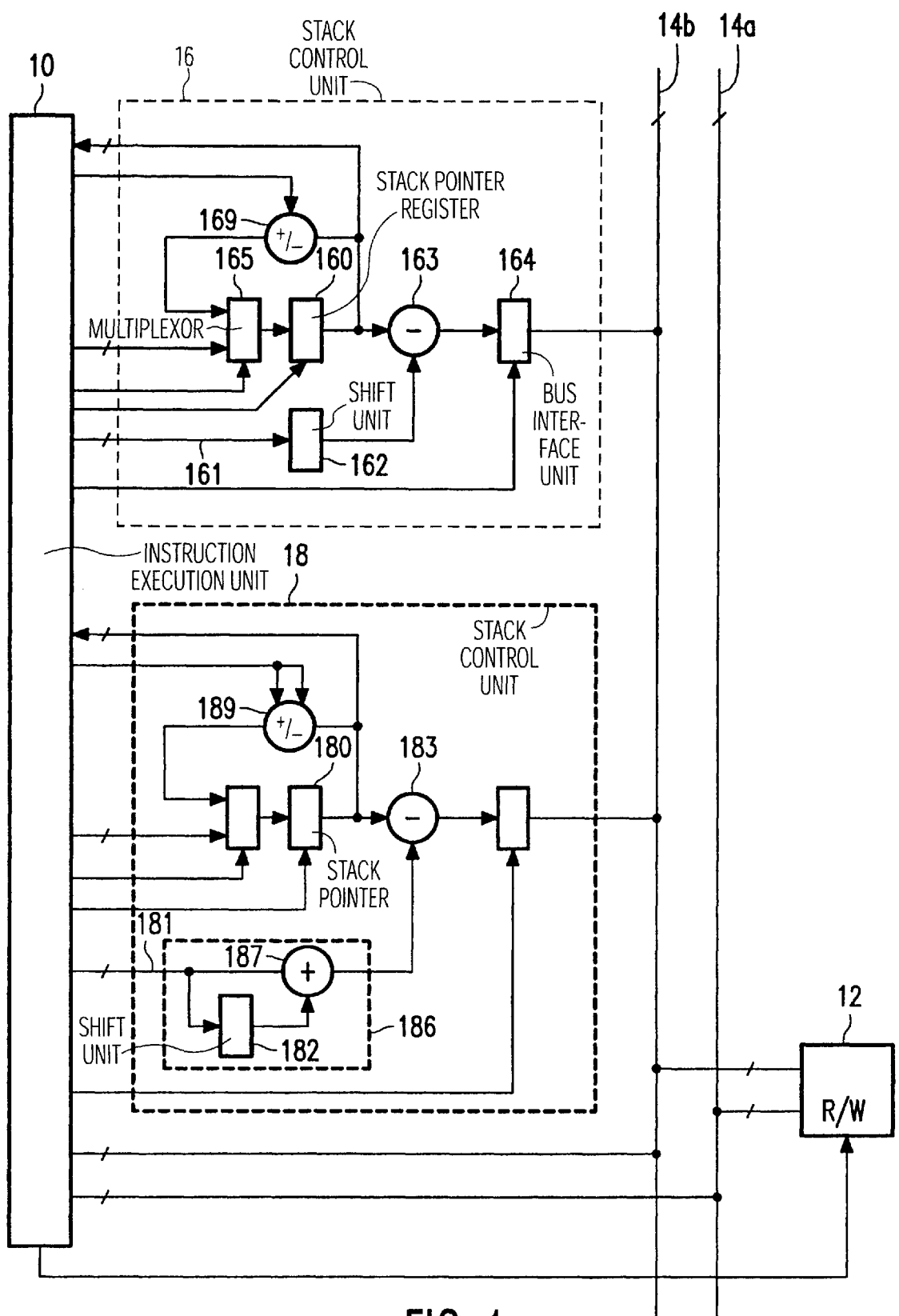
FIG. 1 shows a simplified data processing apparatus for demonstrating a principle of the invention, FIGS. 2a/b show part of an instruction set of a data processing device.

FIG. 1 shows a simplified data processing apparatus for demonstrating a principle of the invention. The apparatus contains an instruction execution unit 10 and a memory 12 both connected to a data bus 14a and an address bus 14b. The apparatus also contains a first and second stack control unit 16, 18, which have a control interface coupled to the instruction execution unit 10 and an output coupled to the address bus 14b.

The first stack control unit 16 contains a stack pointer register 160 with an output coupled to an offset subtractor 163. The control interface to the execution unit 10 contains an offset input which is coupled to an input of the offset subtractor 163 via a shift unit 162. The output of the offset subtractor 163 is coupled to the address bus 14b via a bus interface unit 164. The output of the stack pointer register is also coupled to a first input of a multiplexer 165 via an incremeter/decrementer 169. A second input of the multiplexer 165 is coupled to a stack preset output of the instruction execution unit 10. The output of the multiplexer 165 is coupled to an input of the stack pointer register 160. Control inputs of the multiplexer 165, the stack pointer register 160 and the bus interface unit 164 are coupled to the instruction execution unit 10 via the control interface.

The second stack control unit 18 contains a second stack pointer 180 and is similar to the first stack control unit 16 except that the offset input 181 is coupled to the offset subtractor 183 via a multiply circuit 186. The multiply circuit 186 contains a shift unit 182 and a further adder 187. The offset input 181 is coupled to inputs of the further adder 187 directly and via the shift unit 182. The output of the further adder 187 is coupled to the input of the offset subtractor 183.

FIGS. 2a,b show a table showing various possible instructions from the instruction set of the instruction execution unit 10. The instruction set uses primarily two types of registers: A (or address) registers of 24 bits and D (or data) registers of 16 bits. In the simplified data processing apparatus of FIG. 1 these "registers" actually correspond to locations in memory 12.

The instruction set contains load (Ld) and store (St) operations for loading and storing information from memory to a register and from a register to memory respectively. There are various versions of these instructions (e.g., LdA, LdB, LdD) depending for example on the source or destination register involved (e.g. an address register or a data register) and the type of data to be loaded (e.g. full-word or half-word). In addition the instruction set contains instructions for executing various arithmetic and logic operations such as Add (adding), Sub (subtracting), Shl, Shr (shifting left and right respectively), And Or, Xor (exclusive or) Not (logical inversion). Furthermore the instruction set contains control operations such as Br (Branch), J (Jump) etcetera.

The source operands of the arithmetic and logic operations generally come from D registers or are defined directly in the corresponding instructions. The addresses of source operands of load operations and the destination operands of store operations are generally defined directly in the instructions by a memory address or indirectly by an address stored in a A register to which the instruction refers. In addition there is an Add instruction for A registers.

For many instructions there are a number of versions which differ only by the addressing mode used to handle operands but otherwise define the same operation. For example, the instructions for LdA come in two main versions, a first main version specifying a register and an offset. The operand is located in memory at an address obtained by adding the offset to the content of the specified register. In respective versions of the first main version the offset is 5 bit long or 13 bit long and the whole instruction is 16 bit long or 28 bits long respectively (the opcode is longer for the second version). A second main version specifies the operand value directly. In respective versions of the second main version the operand value is 8 bit or 24 bit long and the instructions are 20 and 36 bits long respectively.

In FIGS. 2a,b machine instructions are illustrated by a description of assembler instructions for the apparatus. An assembler instruction contains a function code followed by and operand description. The first column shows a mnemonic symbol for the function code. The second column counts different versions of an instruction with the same mnemonic. The third column describes the format of the operand description. The fourth until eight column show the number of bits used in the machine instruction for the function code (opcode) and the first, second third and fourth operand (if any) respectively. The final columns shows the total length of the instruction in 4-bit nibbles.

In the format described in the third column different operands of an instruction are separated by comma's. Normally, the first operand denotes the location where the result of the instruction should be stored and the second and possible further operands denote the argument used when executing the function. In the case of LdB and Shr (shift right) instructions, the other operands are preceded by an "s" operand which indicates whether sign extension should occur. In the case of St operations, the first operand refers to the source and the second operand refers to the address of the destination.

An entry for an operand containing "An" signifies that the operand refers to a selectable one of the "A" registers. "Dn" signifies the operand will refer to a selectable one of the "D" registers. The use of "+", "-" and "*" signs before and after registers will be discussed further below. When reference to a register is placed between brackets "(" ")" this signifies that the content of the register referred to will be used as address for the operand. If the reference to a register between bracket is followed by a "+" sign and the word "offset" this means that the assembly instruction contains an offset value that is to be added to the content of the register to obtain the address of the operand. The word "offset" is followed by a number indicating the number of bits used for that operand in the particular instruction.

In a number of instructions a value to be used as parameter for the function is explicitly included. This is variously denoted by the word "offset" without brackets or a "#" sign followed by the word "immediate" or "imm". In each case these words may be followed by a number indicating the number of bits used in the instruction to code the value. Further details of the instructions will be discussed in the following.

In operation the instruction execution unit 10 loads successively the machine code for instructions from the memory 12 and executes them. This begins when the instruction execution unit 10 issues an address of the instruction to the address bus 14b. In response, the memory 12 returns (at least a first part of) the instruction which is then decoded. If it appears from the loaded part that the instruction is not yet complete (instructions can have mutually different lengths), the execution unit 10 also loads the remainder of the instruction. In case of an arithmetic instruction the instruction execution unit 10 then selects the operands and directs them to an arithmetic logic unit (inside the instruction unit: not shown separately); the result of processing by the arithmetic logic unit is stored in a destination register. In case of a load/store operation the instruction execution unit computes the address and fetches or stores information at that address from or to memory respectively.

The D registers and part of the A registers are organized as a separate D-stack and A-stack respectively. Information is stored on the D-stack in units of two bytes (16 bits) and on the A-stack in units of three bytes (24 bits). In the simplified data processing system of FIG. 1 the contents of each stack are stored in memory 12 and the stack pointers 160, 180 in the first and second stack control units 16, 18 contain addresses that point to the memory locations that hold the top of D-stack and the top of the A-stack respectively. The instruction execution unit interprets references to three registers D0, D1 and D2 etcetera in instructions as references to the location of the top of the D-stack, the location one word below the top of the D-stack and the location two words below the top of the D-stack respectively. Similarly, the instruction execution unit interprets references to three registers A0, A1 and A2 etcetera in instructions as references to the location of the top of the A-stack, the location three bytes below the top of the A-stack and the location six bytes below the top of the A-stack respectively. In a version of the LdD instruction (the seventh version), the source operand is denoted as Dn_ext and coded using 3 bits. In this version of the LdD instruction the value in the Dn_ext field may take eight values, which refer to as many positions of different basic units counted from the top of stack, that can be loaded into D0 by the LdD instruction.

When the instruction unit 10 encounters in an instruction a reference to a D register corresponding to a position in the D-stack, it issues to the first stack control unit 16 a code representing the number of registers that this register is offset with respect to the register that corresponds to the top of that D-stack. The shift unit 162 shifts this number by one bit to more significance, effectively multiplying the number by two. The offset subtracter 163 subtracts the result from the contents of the stack pointer register 160. Under control of the instruction execution unit 10, the output of the offset subtraction unit is applied to the address input of the memory 12 and information is written or read from the addressed location, which represents a read or write of the referenced D register.

For simplicity it is assumed that the data path to the memory is wide enough for each basic unit of information on the stack, and that there are no limitations on the addresses that can be used. If this assumption is not satisfied, the bus interface unit 164 may split the information transfer into more than one memory cycle, transferring for example successive bytes that make up one word, or first an initial part of the basic unit that is not located at a word boundary and cannot therefore be addressed in a word transfer operation.

When the instruction unit 10 encounters in an instruction a reference to an A register corresponding to a position in the A-stack, the second stack control unit 18 is used in substantially the same way as the first stack control unit 16. However, in this case, the number of registers that this register is offset with respect to the register that corresponds to the top of that A-stack is effectively multiplied by three, by adding this number to a shifted version of itself.

Thus the computed offset with respect to the memory location that is located at the top of the stack is adapted to the type of stack: it is multiplied by the length of the basic units stored on the stack, that is by two or three in FIG. 1, but of course any other factor may be used depending on the type of information for which the stack is used.

When the instruction execution unit 10 receives a command to push or pop an item from the D-stack or A-stack, the top of stack location in memory 12 is addressed. Under control of the instruction execution unit 10 the incrementer/decrementer 169, 189 computes the stack pointer from the stack pointer register 160, 180 incremented or decremented by the length of a basic unit. The result is used to update the stack pointer register 160, 180. In the case of the first stack control unit 16 for the D-stack this increment or decrement is two. In the case of the second stack control unit 18 for the A-stack this increment or decrement is three. That is, in each case by the length of the basic units stored on the stack.

In the instruction set shown in FIGS. 2a, b several instructions cause the instruction execution unit to execute a pop or push and at the same time to use the top of stack as operand or destination address. In this case a push is denoted by a "+" followed by A0 or D0 and a pop is denoted by and A0 or D0 followed by a "−". In some instructions, push and pop is implicit: in this case no separate bits are needed in the machine instruction to code for push and pop. In this case the mention of the +/− and A0/D0 in the assembler instructions of FIGS. 2a, b serves as a reminder only. In other instructions the push or pop is optional. In this case the +/− is enclosed between brackets "[" "]" and one bit is used in the machine instruction to select whether a push or pop is to be executed.

In the preceding it has been assumed that the stack pointer is incremented on push and decremented on pop and that the stack pointer points to the location of the last pushed information. This is by way of example only, and of course one may instead decrement the stack pointer on push, computing offsets with respect to the stack pointer by adding them to the stack pointer. Also, the stack pointer may point to any memory location with a fixed relation to the top of stack, for example to the location where the next information will be written in response to a push.

It is not even necessary that on pop both stack pointers are changed in the same direction. For example it may be that the stack pointer for the D-stack is incremented on pop and that in contrast the stack pointer for the A-stack is decremented on pop or vice versa. In this case, one may use a single memory address range for both stacks, one stack growing up from the bottom of this range and the other stack growing down from the top of this range until they meet. In this way the common stack space may be used by the stack that needs most space at the expense of space available for the other stack. Preferably, in this case the processing unit contains a collision detector to detect whether the stack pointers for the A-stack and the D-stacks meet. This collision detector will generate a stack overflow error interrupt to prevent that data or addresses from one of the stack overwrites addresses or data from the other stack.

Without deviating from the invention, the stack pointer can also be maintained as a stack base pointer and a counter value representing the number of basic units of information stored on the stack. In that case the top of stack address can be computed by multiplying the count value by the length of the basic unit on the relevant stack (because this is a fixed length the multiplication requires at most merely a couple of additions). The sum of the product and the stack base is the stack pointer. The memory address of a basic units at a given number of units below the top of stack can be computed similarly by first subtracting the given number from the count value.

For the sake of simplicity the stack control units 16, 18 in FIG. 1 are shown as completely separate units, but in practice several functions of these stack control units can be performed by common circuits. For example, the offset subtractors 163, 183 and/or the bus interface units 164 may be shared by the two stack control units because only one stack will be accessed at a time.

When two bits are used to identify an operand register, one may in principle address four different registers, i.e. four positions of basic units on the stack. In an advantageous embodiment of the invention the instruction execution unit 10 treats a reference to a fourth register D3, A3 on one of the stacks as a reference to the top of stack, just like D0 or A0, but if D3 or A3 is used access to the stack is followed by a decrementation or preceded by an incrementation in case the reference to A3 or D3 is used as a source or a destination of an operand respectively. This is in effect a PUSH or POP operation. By using such a register reference to signal PUSH or POP to the execution unit 10, most PUSH and POP operations do not require an additional separate instruction, nor does the instruction referring to D3 or A3 take up much of the instruction set. Thus the memory space needed for storing programs can be minimized. In FIG. 2a,b this possibility is indicated for a selected number of instructions by marking the relevant operand with a "*". This kind of operand treatment may be applied to all instructions which refer to registers or this treatment may be applied only to selected instructions, so that other instructions normally use A3 or D3 for the fourth register.

Preferably, the four registers D0, D1, D2, D3 and the four resisters A0, A1, A2, A3 are coded using two bits in the instruction. Of course if more registers are required that refer to the stack one might more generally use n-bits, using $2**n-1$ values for referring to various offsets to the top of stack and one value to imply pushing or popping.

The instruction execution unit may interpret references to additional registers A4, A5, A6, A7 as references to local registers which refer to the same local storage location independent of the state of the stack. For example register A4 could refer to the A-stack pointer 180, register A5 could refer to the D-stack pointer 160, register A7 could refer to the program counter and register A6 could refer to the program counter to be used on return from a procedure call. All of these registers store addresses of 24 bits and are therefore called A-registers.

In principle, return addresses from subroutine calls may be stored on the address stack as well. However, preferably the instruction execution unit 10 maintains at least one further stack for storing return addresses and for return from interrupt information, for use in JSR (jump to subroutine) instructions RT (return from subroutine) instructions RTI (return form interrupt) instructions etcetera.

Instructions with indirect A-stack references, that is instructions in which an address stored on the A-stack is used to address a memory location, are used only in load and store operations in the instruction set and not for example in arithmetic or logic operations. This makes it possible to combine the two stacks with highly efficient a RISC-like architecture capable of executing one instruction per clock cycle.

The instruction set of FIGS. 2a,b contains some special instructions, such as RET with two bits for parameters which causes a return from subroutine in combination with optional pops from the A and D stack, as coded in the two bits. Si is a software interrupt instruction and Tr is a trap instruction.

In practice the simplified data processing apparatus shown in FIG. 1 is slow because it needs to access memory 10 for each reference to the A-stack and D-stack. Without deviating from the invention this can be improved by caching information that is present in the stacks. For caching a general purpose cache may be used, or dedicated caches for each stack. One can use optimally suited stack management methods because it is known that only those stack locations which can be explicitly referred to in instructions can be needed immediately and that otherwise the stack will usually be accessed sequentially. Consistency between the cache and memory need not be strictly maintained if it is mandated that programmers refrain from accessing memory locations on the stack other than through the stack mechanism.

Figure 3:
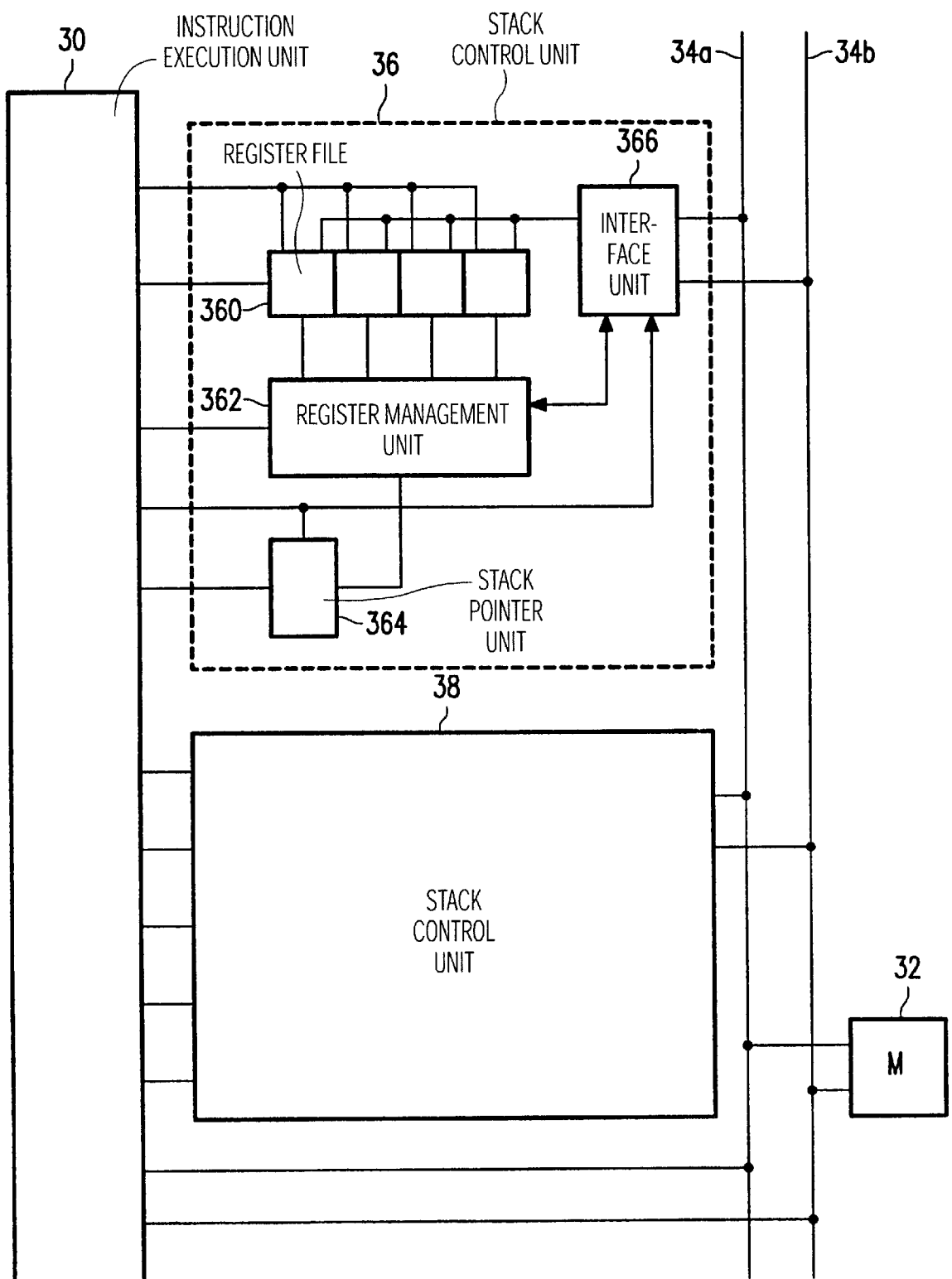
FIG. 3 shows a data processing apparatus with dedicated stack caches/buffers.

FIG. 3 shows a data processing apparatus with dedicated stack caches. The apparatus contains an instruction execution unit 30 and a memory 32 connected by an address bus 34a and a data bus 34b. The apparatus contains a first an second stack control unit 36, 38. The first stack control unit 36 contains a register file 360 with registers sufficiently large to store one basic stack unit each, a register management unit 362, a stack pointer unit 364 and an interface unit 366. The register management unit 362 has a register select input coupled to the instruction execution unit 30 and a register select output coupled to the register file 360. The register file is dual-ported and has access ports connected to the interface unit 30 and the interface unit 366. The stack pointer unit 364 has a control input coupled to the register management unit 362, a write input coupled to the instruction execution unit 30 and an output coupled to the instruction execution unit 30 and the interface unit 366. There is a control connection between the register management unit 362 and the interface unit 366. The interface management unit 366 is furthermore connected to the address bus 34a and data bus 34b.

In operation, the registers in the register file 360 store respective units of information that are stored on the upper part of one of the stacks, for example the A-stack. The register management unit 362 keeps track of a correspondence between respective positions on the stack and registers in the register file 360. This correspondence may be randomly adaptable or a cyclical relation may be used for example. When an instruction refers to a position relative to the top of the stack, the instruction execution unit 30 outputs the reference to the register management unit 362, which in response selects a register in the register file 360 which corresponds to that reference. Thereupon this register is connected to the instruction execution unit 30 for reading or writing a basic unit of information.

In principle, the register management unit 362 keeps one register in the register file 360 in readiness for receiving pushed information. When an instruction commands a push operation on the stack, the register management unit 362 selects this register so that the instruction execution unit 30 stores a basic unit of information in this register. The register management unit 362 commands the stack pointer unit to increase the value of the stack pointer by the length of one basic unit of information. The register management unit 362 updates the correspondence between the registers and the position on the stack, so that this register corresponds to the top of the stack and the remaining registers each correspond to a position one further away from the top of stack than before the push operation.

Thereupon, the register management unit 362 commands the interface unit 366 to transfer the basic unit of information that is furthest from the top of stack from the register file 360 to the memory 32 at the location in memory corresponding to its position on the stack, which the interface unit 366 can compute by subtracting a predetermined number of basic lengths from the value of the stack pointer. In this way the register in the register file 360 that contained the basic unit of information from the register file 360 that is furthest from the top of stack becomes available as the register that is kept in readiness for receiving the next pushed information.

Thus information selected relative to the top of stack will always be available to the instruction execution unit without the delay needed to store in memory 32.

When an instruction commands a pop operation on the stack, the register management unit 362 selects the register in the register file 360 which corresponds to the top of stack so that the instruction execution unit may read this register. The register management unit 362 commands the stack pointer unit 364 to decrease the stack pointer by the length of one basic unit. The register management unit 362 updates the correspondence between the registers and positions on the stack so that this register corresponds to the top of the stack and the remaining registers each correspond to a position one closer to the top of stack before the push operation. Also, the register management unit 362 commands the interface unit 366 to fetch the highest basic unit of information that is not in the register file 360 from memory 32. The interface unit 366 can compute the address of this basic unit by subtracting a predetermined number of basic lengths from the value of the stack pointer. This basic unit is stored in the register that was kept in readiness for receiving the next pushed information and the register that was on the top of stack becomes the register that is kept in readiness for receiving the next pushed information. Of course when the pop operation was preceded by a push operation without intervening pop, the memory fetch is unnecessary and can be omitted because the relevant information is already in the register that was kept in readiness.

Thus information selected relative to the top of stack will is always be available to the instruction execution unit 30 without the delay needed to fetch from memory 32.

In this way, the number of registers in the register file 360 needs to be only one plus the number of positions relative to the top of stack that can be referred to explicitly. However, without deviating from the invention more registers may be used. When more registers are used, the register management unit 362 may postpone commanding write operations to memory 32 after push instructions as long as there are free registers. This may avoid the need for many write operations when the top of the stack is popped before there are no more free registers.

The stack pointer unit 364 and the register management unit 362 may also keep track of the maximum and minimum stack pointer values to avoid that write, read, push or pop operations occur beyond these maxima and minima and if necessary to generate an interrupt of normal instruction execution if this occurs. In case the stacks grow towards each other in opposite directions through the same memory range, this can be replaced by a test that the two stacks do not collide.

If the length of the basic unit is greater than the width of the bus, the interface unit 366 uses more than one bus cycle to transfer a basic unit of stacked information. In case the length L of the basic unit is not an integral multiple of the width W of the bus, there may be an excess of R bits of the basic unit (L=N+W+R, N integer, 0<R<W, e.g., W=16, L=24, and R=8). In this case, on write to memory, the interface unit 366 may refrain from writing the excess of R bits of a particular memory unit and retain them to write them later in combination with the next basic unit of stack information to be written, or for recombination with the rest of the particular basic unit when it is fetched back from memory 32. Similarly, on fetch from memory 32, the interface unit 366 may retain the W-R bits that need to be fetched with the excess bits for use with a fetch of the next basic unit, so that the words in memory 32 that store information from more than one basic unit need not be accessed twice as often as words that store information from only on basic unit. Alternatively, the interface unit 366 may fetch or write more than one (M) basic units at a time so that together they take up an integral number of bus widths (M*L=N*W).

The apparatus can even be more efficient if an architecture is used with different memories for each stack respectively, with different bus widths adapted to the length of the basic units of the particular stack. However, the programmer of the apparatus does not need to know this because there is no need to modify the instruction set in this case. Programs for on architecture can be easily ported to the other architecture.

The second stack control unit 38 operates analogous to the first stack control unit 36, except that it uses basic units of a different length. Alternatively, the stack control unit of FIG. 1 may be used.

The apparatus may provide for an additional addressing mode that uses blocks of memory 12, 32 that can be addressed by offsets to an address derived from a most significant part of the program counter (e.g. in case of a 24 bit program counter only the 15 most significant bits). For example, an instruction using this addressing mode contains an offset of N bits. The instruction execution unit interprets this instruction as referring to a memory location with an address having the N bits of the offset as least significant bits and the M-N most significant bits of the program counter (which itself contains M bits) as most significant bits. Thus common data for a number of instructions at neighbouring locations can be referred to with relatively little instruction length used for the offset and after a jump to subroutine instruction, the common data can be redefined without any overhead.

In some cases it is desirable to associate a type code with data-items, for example to indicate whether the data-item is an individual 16 bit word or whether it is part of a 32 bit word (the rest of the word being stored in a logically adjacent memory location or in a logically adjacent register). In another example the type code might indicate whether the data item represents a floating point variable or a fixed point variable or an integer variable. When a type code is associated with a data-item the instruction execution unit can make a run-time selection of a type of operation appropriate to the type code of a data-item when a data-item is referred to as an operand. This means that explicit instruction versions for different for different types are not needed. As a result fewer instruction versions are needed to distinguish between operations. This has the advantage that shorter machine instruction codes can be used to distinguish between operations, reducing the amount of memory needed for instructions.

To implement the use of data-items with type codes, an instruction execution unit would contain a circuit for detecting the type of the incoming operands and a switchable arithmetic/logic unit, that is controlled by the circuit for detecting the type so as to select execution of the arithmetic logic operation appropriate for the detected type. Furthermore, the instruction execution unit would have instructions to convert data-items from one type to another.

When such an instruction execution unit is used that associates types with operands (in particular with D operands), the increments and decrements of the stack pointer should be adjustable under control of the type code of the basic unit on top of the stack. For example, if the type code of the item on top of stack indicates a 16 bit word, in case of a pop the stack control unit decreases the stack pointer by two byte addresses (or by one word address) and if the type code of the item on top of stack indicates a 32 bit word a pop the stack control unit decreases the stack pointer by four byte address (or by two word addresses). Similarly, in case of a push, the instruction execution unit examines the type code of the pushed data-item and causes the stack control unit to increase by two or by four byte addresses, as appropriate for the type code and 16 bit or 32 bit is stored on the stack.

In this case a type code should be stored for each stacked item. This may be realized for example by maintaining an additional stack of type codes, which is pushed and popped automatically when the corresponding stack is pushed or popped.

The apparatus shown in the figures can be implemented as a single integrated circuit chip device. In this case the invention is especially advantageous because it reduces the amount of memory required for a typical program and therefore the area of the chip. However, the memory may also be at least partly external to the integrated chip device. However, the device according to the invention may also be build from several integrated circuit chips in combination, with or without the memory.

What is claimed is:

1. A data processing device comprising
a first stack control unit and a second stack control unit containing a first and second stack,
an instruction execution unit having an instruction set containing first and second instructions causing a push and/or pop of the first and second stack respectively, and
means for maintaining push and/or pop information in basic units of a first and second length of the first and second stack respectively, first and second length being unequal, and not an integer multiple of one another, and wherein the first stack is used for addressing and the second stack is used for data,
wherein the first and second stack control units are physically separate from one another and both the first and second stacks are maintained during a common task.

2. A data processing device according to claim 1, wherein the instruction set uses a first and second addressing mode for designating storage locations in terms of an offset relative to a top of the first and second stack respectively, expressability of the offset being restricted to numbers of basic units for one of the first or second stacks.

3. A data processing device comprising
a first stack control unit and a second stack control unit containing a first and second stack,
an instruction execution unit having an instruction set containing first and second instructions causing a push and/or pop of the first and second stack respectively, and
means for maintaining push and/or pop information in basic units of a first and second length on the first and second stack respectively, the first and second length being unequal, and in that the instruction set uses a first and second addressing mode for designating storage locations in terms of an offset relative to a top of the first and second stack respectively, expressability of the offset being restricted to numbers of basic units for one of the first or second stacks, and wherein the first stack is used addressing and the second stack is used for data,
wherein the first and second stack control units are physically separate from one another and both the first and second stacks are maintained during a common task.

4. A data processing device according to claim 2, wherein the offset for a source operand is coded using a group of bits, a first predetermined combination of values of said bits causing the instruction execution unit to read the top of stack and pop from the appropriate stack and a second combination of values of said bits causing the instruction execution unit to read the top of stack without changing the appropriate stack, remaining combinations of values of said bits causing the instruction execution unit to read storage locations offset relative to the top of one of the first or second stacks.

5. A data processing device according to claim 2, wherein the offset for a result destination is coded using a group of bits, a first predetermined combination of values of said bits causing the instruction execution unit to push the appropriate stack and write to the top of stack and a second combination of values of said bits causing the instruction execution unit to write to the top of stack without pushing, remaining combinations of values of said bits causing the instruction execution unit to write storage locations offset relative to the top of one of the first or second stacks.

6. A data processing device according to claim 1, comprising a memory range with locations in which information from basic units both from the first stack and from the second stack may be stored alternatively, wherein the first stack grows from a top of a memory range and the second stack grows from a bottom of that memory range.

7. A data processing device according to claim 1, wherein the first stack is a data stack and the second stack is an address stack, instructions in the instruction set using information from the second stack to address memory locations of operands and/or results and information from the first stack as operands and/or results themselves.

8. A data processing device according to claim 1, comprising means for handling a third stack for return information for subroutine calls and/or interrupts in the course of executing a program of instructions.

9. A data processing device according to claim 3, wherein the offset for a source operand is coded using a group of bits, a first predetermined combination of values of said bits causing the instruction execution unit to read the top of stack and pop from the appropriate stack and a second combination of values of said bits causing the instruction execution unit to read the top of stack without changing the appropriate stack, remaining combinations of values of said bits causing the instruction execution unit to read storage locations offset relative to the top of one of the first or second stacks.

10. A data processing device according to claim 3, wherein the offset for a result destination is coded using a group of bits, a first predetermined combination of values of said bits causing the instruction execution unit to push the appropriate stack and write to the top of stack and a second combination of values of said bits causing the instruction execution unit to write to the top of stack without pushing, remaining combinations of values of said bits causing the instruction execution unit to write storage locations offset relative to the top of one of the first or second stacks.

11. A data processing device according to claim 2, comprising a memory range with locations in which information from basic units both from the first stack and from the second stack may be stored alternatively, wherein the first stack grows from a top of a memory range and the second stack grows from a bottom of that memory range.

12. A data processing device according to claim 3, comprising a memory range with locations in which information from basic units both from the first stack and from the second stack may be stored alternatively, wherein the first stack grows from a top of a memory range and the second stack grows from a bottom of that memory range.

13. A data processing device according to claim 2, wherein instructions in the instruction set use information from the first stack to address memory locations of operands and/or results, and wherein instructions in the instruction set use information from the second stack as operands and/or results themselves.

14. A data processing device according to claim 3, wherein instructions in the instruction set use information from the first stack to address memory locations of operands and/or results, and wherein instructions in the instruction set use information from the second stack as operands and/or results themselves.

15. A data processing device according to claim 2, comprising means for handling a third stack for return information for subroutine calls and/or interrupts in the course of executing a program of instructions.

16. A data processing device according to claim 3, comprising means for handling a third stack for return information for subroutine calls and/or interrupts in the course of executing a program of instructions.

* * * * *